United States Patent Office 3,163,665
Patented Dec. 29, 1964

3,163,665
GOLD SECONDARY MERCAPTIDES
Howard M. Fitch, Summit, N.J., assignor to Engelhard Industries, Inc., Newark, N.J., a corporation of Delaware
No Drawing. Filed Aug. 30, 1961, Ser. No. 134,824
17 Claims. (Cl. 260—430)

This invention relates to new and improved gold decorating compositions, a method of decorating with such compositions, novel gold secondary mercaptides for use in the decorating compositions, and a process for preparing such mercaptides.

Gold decorating compositions containing gold sulforesinates are known to the art and have been described, for example, by Boudnikoff, Compt. rend. 196, 1898 (1933), and by Chemnitius, J. Prakt. Chem. 117, 245 (1927). The gold sulforesinates are prepared by reacting a gold salt with a sulfurized terpene such as sulfurized Venetian turpentine. The are dissolved in vehicles such as oils of lavender, rosemary, aniseed, sassafras, wintergreen and fennel, turpentine, various terpenes, nitrobenzene, amyl acetate and the like, and mixed with gold fluxes such as salts and resinates of rhodium, chromium, bismuth, lead, cadmium, tin, copper, cobalt, antimony and uranium, Assyrian asphalt and various rosins to form gold decorating compositions. More recently, it has been proposed in U.S. Patent No. 2,490,399 to use gold cyclic terpene mercaptides in place of gold sulforesinate in such compositions. The structures of these gold cyclic terpene mercaptides have never been elucidated, and the location of the mercaptide group in the molecule is not known. The gold mercaptide of thioborneol has been prepared by Nakatsuchi, J. Soc. Chem. Ind., Jap. 38, Suppl. 617B (1935), although the use of this material in gold decorating compositions has not been described.

Gold decorating compositions are compositions that form a film of metallic gold when applied to various surfaces and heated. Such compositions, which have been known for a hundred years or more, have been based on a cyclic terpene technology. The gold compounds in such compositions have been derivatives of cyclic terpenes and sulfur, originally in the form of sulforesinates and more recently in the form of cyclic terpene mercaptides. It has been assumed that the cyclic terpene radical is somehow essential to gold compounds suitable for use in gold decorating compositions, and other organic gold compounds have not been employed. The gold compounds derived from cyclic terpenes have the disadvantage of requiring relatively high firing temperatures, limiting their use to refractory substrates such as glass, ceramics, quartz and the like. They have the further disadvantage of being derived from natural products that are in variable supply and of variable composition.

In accordance with the present invention, the gold decorating composition comprises a gold secondary mercaptide and a vehicle therefor. More specifically the gold secondary mercaptide is one having the formula

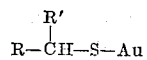

wherein R and R' are alkyl, cycloalkyl, aryl or aralkyl radicals. An outstanding advantage of the gold decorating compositions of this invention is their requiring only relatively low temperatures to form a metallic film, which is due to the presence of the gold secondary mercaptides. By reason of requiring only relatively low temperature for forming the metallic film, these decorating compositions are well suited for decorating non-refractory materials including a wide range of plastics, plastic laminates, wood, paper, textiles, leather and the like which would be damaged by the use of high temperatures. The gold decorating compositions previously used required relatively high temperatures, due to the gold compounds present therein, to form a metallic film, and hence their application was limited to decoration of relatively refractory materials such as glass, ceramics, metals, quartz, carbon, mica, and other materials that were not damaged by the high temperatures required. The gold decorating composition of this invention can be applied to these relatively refractory materials as well as to the non-refractory materials previously mentioned. The gold compounds present in the gold decorating compositions of this invention have the further advantage of being of fixed and readily reproducible composition, since they are not derived from natural products such as cyclic terpenes.

Further, while the ability to form a decorative film of precious metal at relatively low temperature is an outstanding property of the gold decorating compositions of this invention, the use of the gold decorating compositions of this invention also is meritorious in attaining production of films of metallic gold which exhibit (1) a high degree of reflectivity to light and particularly to infrared radiation, making them useful as reflectors for lamps, ovens, and the like; (2) electrical conductivity making them useful in forming printed circuits and resistors and as bases for soldering connections to non-conductive materials, for electroplating and plating by dipping in molten metals and alloys; and (3) chemical inertness, making them useful for protecting the underlying surface from corrosion, oxidation and the like.

Alkyl radicals which can be present as the R or R' of the foregoing formula for the gold secondary mercaptides of this invention are, for example, methyl, ethyl, butyl, isobutyl, heptyl, dodecyl and octadecyl. Examples of the cycloalkyl radicals which can be present are cyclobutyl, cyclopentyl and cyclohexyl. The aryl radicals are, for example, phenyl, naphthyl and phenanthryl; and the aralkyl are, for example, benzyl, 2-phenylethyl and 4-phenylbutyl. Gold secondary mercaptides of the foregoing formula containing at least one aryl or aralkyl radical are preferred as giving gold films of the best color and brightness. Gold alpha-methylbenzyl mercaptide gives films of outstanding pure golden yellow color and brilliance and is particularly preferred.

In a preferred embodiment, the gold decorating compositions contain a gold flux in addition to the vehicle and the gold secondary mercaptide. The choice of ingredients for the flux determines the behavior of the gold film during and after firing, and is usually dictated by the composition of the article to be decorated and the use for which it is intended. The flux will usually contain small amounts of salts or resinates of rhodium or iridium to improve the continuity and brilliance of the gold film. Other ingredients such as salts and resinates of bismuth, chromium, lead, cadmium, tin, copper, cobalt, antimony and uranium are employed to improve the adherence of the gold film and its resistance to abrasion. The ingredients fuse to a low melting glass or glaze as a result of the firing. The conventional glazes can not be used to promote adherence of the gold film to non-refractory materials such as plastics and plastic laminates and the gold film on such material may be protected, if desired, by a coating of lacquer or varnish or by laminating a thin film of plastic to the surface. The lacquer may also be incorporated in the gold decorating compositions to provide an adherent film.

The vehicles which can be utilized in the decorating compositions of this invention include, in addition to simple solvents, mixtures of essential oils, terpenes, resins and the like, carefully chosen to impart specific physical properties to the composition. The choice of vehicle controls the behavior of the composition before firing and is dictated by the method by which the composition is to be applied. The physical properties imparted to the composition by the vehicle chosen, such as oiliness, viscosity, evaporation rate, surface tension and tack, will vary for different methods of application, such as brushing, spraying, stippling, stamping, printing, both direct and offset, hot or cold screen printing, stenciling, decalcomania and the like. Typical vehicles include mixtures of two or more of the following ingredients: methyl ethyl ketone, cyclohexanone, ethyl acetate, amyl acetate, Cellosolve, butanol, nitrobenzene, toluene, xylene, petroleum ether, chloroform, carbon tetrachloride, various terpenes such as pinene, dipentene, dipentene oxide and the like, essential oils such as oils of lavender, rosemary, aniseed, sassafras, wintergreen, fennel and turpentine, Assyrian asphalt, various rosins and balsams, and synthetic resins. For special applications such as compositions for hot screening, special vehicles such as waxes and thermoplastic resins may be used. Such compositions, when applied through a hot screen to an article maintained at a relatively lower temperature, immediately set to a hard film and are more fully described in copending U.S. application Serial No. 14,168, filed March 11, 1960, now U.S. Patent 3,092,504.

The gold secondary mercaptides may be prepared by admixing a secondary mercaptan of the formula

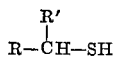

in which R and R' have the foregoing significance with a gold salt, such as auric bromide, auric iodide, potassium bromaurate and potassium iodoaurate. Auric chloride or potassium chloraurate are preferred, however, since they are stable and easy to prepare. Auric chloride is prepared by dissolving metallic gold in aqua regia and removing the nitric acid present by repeated evaporations with hydrochloric acid. Removal of the excess hydrochloric acid is not necessary, and the resulting solution, known as gold liquor, is suitable for use in preparing gold secondary mercaptides. The gold liquor may be diluted with water before use, or solvents such as ethyl acetate or methanol may be used. Preferably from three to four moles of mercaptan to one mole of auric chloride are used, and higher ratios may be employed, but without substantial advantage. The reaction temperature is not critical, and may vary from 0 to about 100° C. Usually, it is preferable to mix the mercaptan and gold salt in a suitable solvent at a temperature in the range of about 10 to 50° C. and to complete the reaction by heating to temperatures in the range of about 60 to 80° C. Temperatures in excess of 100° C. should be avoided due to the relatively low temperatures at which these mercaptides are converted to metallic gold. The reaction is somewhat exothermic, and it is usually preferable to add one reactant to the other slowly or in increments with cooling if required. The reaction product is obtained as an oil or an oily solid containing any excess mercaptan and large amounts of disulfides formed in the reaction. The product is purified by washing or leaching with methanol, or with mixtures of methanol with acetone, isopropanol or benzene. Some of the less soluble gold secondary mercaptides may be further purified by crystallization from a suitable solvent such as toluene.

In this method of preparation, disulfides are formed according to the following reaction, in which R and R' have the foregoing significance:

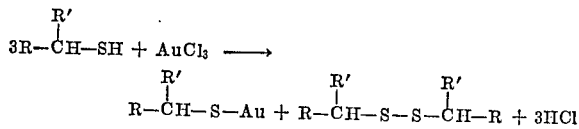

Thus, for every mole of mercaptan combined as gold mercaptide, two moles of mercaptan form the disulfide.

This is disadvantageous, particularly when the more expensive mercaptans are used and with mercaptans forming the more soluble gold mercaptides, since substantial amounts of gold mercaptide are lost in separating the disulfide. It would, therefore, be advantageous to employ an aurous salt such as aurous chloride in the reaction in order to eliminate disulfide formation. Aurous salts are notoriously difficult to make, however, and are of poor stability, and they tend to be contaminated with greater or lesser amounts of metallic gold. Some success has been claimed for the use of aurous cyanide in various reactions, but the use thereof is complicated by the toxic nature of the hydrogen cyanide produced as a by-product.

Alkyl sulfides are known to react with auric halides to give alkyl sulfide-aurous halide complexes according to the following equation in which R" is a lower alkyl group, for instance methyl, ethyl, butyl or octyl, and X is halogen, for instance chlorine, bromine or iodine:

$$2R''_2S + AuX_3 + H_2O \rightarrow R''_2S \cdot AuX + R''_2SO + 2HX$$

In accordance with the present invention, it has been found that the alkyl sulfide-aurous halide complexes disclosed supra react with secondary mercaptans to give gold secondary mercaptides according to the following equation in which R, R', R" and X have the foregoing significance:

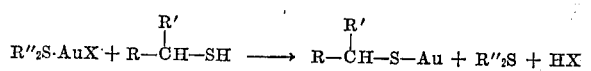

The reaction proceeds smoothly at normal or room temperatures to give high yields of gold secondary mercaptides that are uncontaminated with disulfides or metallic gold. Use of the methyl sulfide-aurous chloride complex or of the ethyl sulfide-aurous chloride complex is preferred, since auric chloride and methyl and ethyl sulfides are readily available as starting materials and the sulfoxides and excess sulfides are readily removed from the product. In forming the alkyl sulfide-aurous halide complex, reaction temperatures between 0° C. and 40° C. are employed. The reaction is effected by preferably mixing the alkyl sulfide and gold halide in an aqueous medium at the temperatures stated and, without isolating the reaction product, adding promptly the secondary mercaptan to the reaction mixture. The lower alkyl sulfide-aurous halide complexes tend to decompose upon exposure to air and upon attempted isolation or purification, with the formation of metallic gold. This decomposition is avoided by using excess lower alkyl sulfide and by not isolating the lower alkyl sulfide-aurous halide complex. An excess of about one mole is sufficient to prevent decomposition, and it is preferred to use a total of about 3 moles of lower alkyl sulfide per mole of auric halide. Higher ratios may be used, but without substantial advantage. Temperatures in excess of 40° C. should be avoided due to the volatility of the lower alkyl sulfides and the instability of the complex. Temperatures below 0° C. should also be avoided due to the tendency of the aqueous reaction mixture to freeze, although somewhat lower temperatures may be used with solvents such as methanol. The reaction between the lower alkyl sulfide and the auric halide is somewhat exothermic, and cooling of the reaction mixture usually will be required. The reaction of the complex with the secondary mercaptan is only very mildly exothermic, and little cooling is required for this reaction. Other solvents such as methanol may be used, but it is apparent from the above equations that at least one mole of water is required for the reaction. When the gold salt is in the form of gold liquor, sufficient water usually will be available, but when anhydrous gold salts are used in solvents other than water, at least one mole of water per mole of gold salt should be present in the reaction mixture. The gold secondary mercaptides may be recovered from the reaction mixture by filtration or in the case of the more soluble gold secondary mercaptides by extraction with a suitable solvent such as chloroform or toluene, and they may be purified, if desired, by washing with water and with methanol and in some cases by crystallization from a suitable solvent such as toluene or ethyl acetate.

Although the secondary mercaptides of this invention are aurous mercaptides, they are referred to herein simply as gold mercaptides, since auric mercaptides are not known and the same aurous mercaptide is obtained from auric salts and from aurous salts. The gold secondary mercaptides of this invention are characterized by being non-terpenoid, i.e. free of terpene substituents, and also free of polar substituents such as, for instance —OH and —COOH groups and other polar groups. These polar substituents render the mercaptide water soluble, and these water-soluble compounds are unsuitable for use in gold decorating compositions.

Pure secondary mercaptans are not essential to the practice of this invention, and commercial grades are suitable. Mixtures of secondary mercaptans may also be employed for reaction with the organic sulfide-aurous halide complex to give mixtures of gold secondary mercaptides.

As previously pointed out, the gold compounds previously used in decorating compositions required relatively high temperatures to form a metallic film, limiting their application to the decoration of relatively refractory materials such as glass, ceramics, metals, quartz, carbon, mica and other materials that were not damaged by the high temperatures required. An outstanding advantage of the gold secondary mercaptides of this invention is the relatively low temperature required to form a metallic film therefrom, extending their application to a wide range of plastics, plastic laminates, wood, paper, textiles, leather and the like that would be damaged by high temperatures. A roughly quantitative estimate of the firing temperatures required was made by brushing solutions or suspensions in toluene, adjusted to a gold content of 10 percent, onto glass slides. After evaporation of solvent, the slides were heated for one hour in a precisely controlled mechanical convection oven, and the films obtained were tested for electrical conductivity. The tests were repeated at temperature intervals of 5° C. to determine within 5° C. the minimum temperature required to produce conductivity showing the formation of a continuous film of metallic gold on the slide. It will be recognized that firing would ordinarily be conducted at a higher temperature or for a longer period of time or both in order to obtain maximum conductivity and brilliance of the film. Nevertheless, the minimum firing temperatures obtained in this manner give a reproducible index of the relative temperatures required for practical decorating compositions. The results of these tests, listed in Table I, show that the compounds of the present invention fire to metallic films at temperatures substantially below those required for the gold compounds of the prior art.

TABLE I.—MINIMUM TEMPERATURES REQUIRED TO OBTAIN A CONDUCTIVE FILM IN ONE HOUR

| Example | Compound | Temp., °C. |
|---|---|---|
| Prior art | Gold sulforesinate | 270 |
| Prior art [1] | Gold pinene mercaptide | 205 |
| 2-A | Gold isopropyl mercaptide | 165 |
| 2-B | Gold secondary butyl mercaptide | 150 |
| 2-C | Gold 1-methylheptyl mercaptide | 165 |
| 2-D | Gold 1-methyldodecyl mercaptide | 170 |
| 2-E | Gold 1-methyloctadecyl mercaptide | 180 |
| 2-F | Gold diisobutylmethyl mercaptide | 180 |
| 1 | Gold alpha-methylbenzyl mercaptide | 165 |
| 2-G | Gold alpha-butylbenzyl mercaptide | 165 |
| 2-H | Gold alpha-undecylbenzyl mercaptide | 145 |
| 2-I | Gold 1-(alpha-naphthyl)ethyl mercaptide | 190 |
| 2-J | Gold 1-benzylethyl mercaptide | 170 |
| 2-K | Gold 1-(diphenylmethyl)ethyl mercaptide | 175 |
| 2-L | Gold diphenylmethyl mercaptide | 170 |
| 2-M | Gold alpha-benzylbenzyl mercaptide | 170 |
| 2-N | Gold dibenzylmethyl mercaptide | 165 |
| 2-O | Gold dicyclohexylmethyl mercaptide | 165 |

[1] Prepared as described in Example I of U.S. Patent No. 2,490,399.

The ability to form a metallic film at relatively low temperatures is a distinct advantage even in applications on relatively refractory materials where it may be desirable to heat the material to the point of incipient softening, which may vary from about 500° C. for a soft glass to about 800° C. for a ceramic glass and even higher for refractory materials such as quartz to improve the adherence of the metallic film. The initial formation of the metallic film should take place in an oxidizing atmosphere in order to promptly and completely remove organic matter from the film. This oxidizing atmosphere is usually provided by good ventilation of the oven or kiln in which the metallic film is produced, and such ventilation becomes increasingly difficult and costly with increases in temperature, since heat is lost to the air introduced by ventilation. Once the metallic film has been developed, further heating may be accomplished without good ventilation and consequent heat loss.

Among the gold decorating compositions of this invention, the preferred compositions are the liquid bright golds, which give specular bright films on firing. Generally speaking, the ingredients of the liquid bright golds are all soluble in the vehicles employed, giving clear solutions, or become soluble in the vehicles in the process of firing. Another class of gold decorating compositions are the burnish gold decorating compositions such as are described, for example, by Chemnitius, J. Prakt. Chem. 177, 245 (1927), by Ballard in U.S. Patent No. 2,383,704, by Chandra in British Patent No. 731,906 and in my copending U.S. Patent Application No. 774,820, filed November 19, 1958, now U.S. Patent No. 2,994,614. Generally speaking, such compositions contain insoluble ingredients such as, for example, gold powder, mercuric oxide, bismuth subnitrate and lead borate. They are employed as pastes or suspensions rather than as solutions and fire to gold films that are dull and matte in appearance. On burnishing, the films so obtained take on the soft golden luster characteristic of burnished gold. The addition of the gold secondary mercaptides of this invention to such compositions gives films that are brighter and require less burnishing than those obtained from the conventional burnish golds. As may be seen from the examples that follow, gold secondary mercaptides such as gold isopropyl mercaptide having low solubility in organic vehicles may also be employed as the sole gold compound in burnish gold decorating compositions.

Another class of gold decorating compositions is the gold lusters. These lusters resemble liquid bright gold in composition, but contain relatively less gold and more gold flux. Instead of firing to a conductive film of bright gold, the gold luster compositions give non-conductive films of various colors, depending upon the amount of gold present and the nature of the gold flux, having a characteristic golden sheen or luster. The colors produced are believed to result from the presence in the film of colloidal metallic gold in various particle sizes. The gold secondary mercaptides of this invention are suitable ingredients for such luster compositions.

The gold secondary mercaptides of this invention are also suitable for use in decorating compositions containing other precious metals such as platinum, palladium and silver that serve to modify the color, appearance, reflectivity and electrical conductivity of the metallic film formed on firing. Platinum and palladium in such compositions give films ranging from reddish gold to silver to grey to black with increasing amounts of platinum or palladium. Silver compounds such as silver resinate give films of a lemon yellow color and with increasing amounts of silver of a greenish yellow color. Platinum and palladium resinates and sulforesinates such as those described by Chemnitius, Sprechsaal 60, 226 (1927), and by Ernst in U.S. Patent No. 1,954,353 may be employed in such compositions. Preferably, however, lower firing platinum and palladium compounds such as those described in my copending U.S. patent applications 4,212, filed January 25, 1960, now U.S. Patent No. 3,022,177, and 60,575, filed October 5, 1960, are employed to take full advantage of the low firing characteristics of the gold secondary mercaptides of the invention.

The gold content of gold decorating compositions varies with the method of application and intended use. Generally speaking, gold lusters contain about 0.1–3 percent gold, liquid bright golds for spraying contain about 2–10 percent gold, liquid bright golds for brushing contain about 5–15 percent gold, gold compositions for screening or stamping contain about 8–25 percent gold, and burnish golds may contain about 12–40 percent or more of gold.

Firing temperatures employed range between about 150 and 1350° C., preferably between about 200 and 800° C. Of course, the particular firing temperature will depend on the substrate being decorated and will be considerably lower when decorating thermoplastic materials than when decorating ceramics or ferrous metals such as stainless steel. It is usually advantageous to fire to the incipient softening point of the substrate. Temperatures of between 150 and 300° C. are advantageous for firing the applied decorating composition on thermoplastic articles, and temperatures between about 350 and 750° C. are advantageous for firing the applied decorating material on glass. Firing temperatures between about 450 and 700° C. are advantageously used for firing the decorating material on stainless steel, and firing temperatures between about 350 and 900° C. are advantageously used when firing the decorating material on porcelain and glazed earthenware. For some special applications such as decorating and ceraming glass-ceramics in a single firing operation, temperatures as high as 1350° C. are required. Such high temperatures require special fluxes such as resinates of tantalum and niobium as described in co-pending U.S. Patent Application No. 99,046, filed March 29, 1961. In every case, the firing is carried out for a time sufficient to decompose the gold secondary mercaptides and volatilize the decomposition products. By the term "ceramic" article used herein is meant an article or body of glass, porcelain, terra cotta, glass-ceramic, earthenware or other ceramic ware.

In the specific examples that follow, test pieces coated with the decorating compositions of the invention were fired under various conditions. Where kiln firing is specified, it is to be understood that the pieces were placed in a kiln which was heated to a specified temperature, held at about this temperature for about 10 minutes and cooled, the total operation requiring an hour or more. Where lehr firing is specified, it is to be understood that the pieces were passed through a continuous lehr having a specified peak temperature, passage through the lehr requiring from one and one-fourth to one and one-half hours. Where infra-red firing is specified, the pieces were placed under an infra-red heat source giving a temperature of the order of 250° C. for a specified period of time. It is to be understood that the metallic films formed in each case were adherent and good conductors of electricity unless otherwise noted.

The gold secondary mercaptides that are obtained as solids do not melt sharply by the capillary tube method, and their decomposition temperatures depend upon the rate of heating, becoming lower with slower rates of heating. The melting and decomposition points given in the examples following were obtained in capillary tubes heated at the rate of about 5° C. per minute.

The invention will be further illustrated by reference to the following specific examples:

EXAMPLE 1

*Gold Alpha-Methylbenzyl Mercaptide*

*Method A.*—To 117.8 g. technical grade alpha-methylbenzyl mercaptan of 94 percent purity (0.80 mole) was added a solution of 112.5 g. gold liquor, containing 35 percent gold (0.20 mole) in the form of auric chloride, in 100 cc. ethyl acetate with stirring during 30 minutes. The temperature increased from 26 to 40° C. during the addition, and hydrogen chloride was evolved. After 20 minutes of further stirring, the temperature had fallen to 24° C. The mixture was stirred and heated to 60° C. during 20 minutes and at about 60° C. for one hour. The product was a yellow oil and a clear, colorless supernatant liquid that was removed by decantation. The residual oil was washed with four 200 cc. portions of water at about 60° C., decanting the water after each wash. Further washing in the same way with two 200 cc. portions of methanol caused the oil to become viscous and semi-solid, and after stirring with 400 cc. boiling methanol the oil became a well dispersed solid. After decanting the methanol, the solid was stirred with 400 cc. boiling acetone, and the mixture was cooled to room temperature and filtered. The precipitate, washed on the filter with 200 cc. acetone and air dried, was 54.5 g. yellow solid. This was dissolved in 75 cc. chloroform and poured with good stirring into one liter of acetone. After stirring for one hour, the mixture was filtered, and the precipitate was washed on the filter with 200 cc. acetone and dried. The product was 53.1 g. pale tan solid containing 58.87 percent gold. It darkened ca. 180° C. and decomposed with partial melting between 190 and 200° C.

*Method B.*—To a solution of 157.7 g. gold liquor, containing 37.46 percent gold (0.30 mole) in the form of auric chloride, in 1200 cc. water was added 55.9 g. methyl sulfide (0.90 mole) with stirring at 6 to 7° C. during 20 minutes. A voluminous precipitate of methyl sulfide-aurous chloride formed. After stirring for 10 minutes longer, 48.6 g. technical grade alpha-methylbenzyl mercaptide of 94 percent purity (0.33 mole) was added with stirring at 3 to 4° C. during 15 minutes. A lumpy precipitate formed that dissolved on adding 75 cc. chloroform and warming to room temperature. The mixture was stirred at room temperature for one hour, while slowly warming to 50° C. during one-half hour and at 50 to 55° C. for one-half hour, and the supernatant aqueous layer was removed by siphoning from a residual oil. The oil was washed with three 400 cc. portions of water at 50 to 60° C., siphoning off the water layer after each wash, and remaining water was removed in a separatory funnel. The oil was added dropwise with good stirring to 2 liters of methanol during one-half hour. The resulting mixture was heated to boiling, stirred well, let stand overnight and filtered. The precipitate was washed on the filter with 250 cc. methanol, dissolved in 200 cc. chloroform and added dropwise with good stirring to 2.5 liters methanol during 1 hour. The mixture was stirred and heated to 55° C. during one-half hour and at ca. 55° C. for one-half hour, let stand overnight and filtered. The precipitate, washed on the filter with 250 cc. methanol and dried, was 99.5 g. yellow solid containing 59.05 percent gold.

*Method C.*—To a mixture of 129.2 g. ethyl sulfide (1.2 mole) and 400 cc. water was added 225.6 g. gold liquor, containing 34.97 percent gold (0.40 mole) in the form of auric chloride with stirring at 5 to 10° C. during 13 minutes. After stirring for 40 minutes longer at 10 to 15° C., 60.8 g. technical grade alpha-methylbenzyl mercaptan of 94% purity (0.41 mole) and 80 cc. chloroform were added with stirring at 15 to 20° C. during 45 minutes. After stirring for 35 minutes longer, the supernatant aqueous layer was removed by siphoning from the residual chloroform layer. The chloroform layer was washed with three 400 cc. portions of water, siphoning off the water after each wash. One-half liter of methanol was rapidly added to the residual chloroform layer with good stirring. The mixture was stirred for one hour and 20 minutes, let stand overnight and filtered. The precipitate, washed with 750 cc. methanol and dried, was 98.25 g. granular, pale yellow solid containing 58.50 percent gold.

EXAMPLE 2

Other Gold Secondary Mercaptides

A series of gold secondary mercaptides was made in the following manner. To 0.3 mole ethyl sulfide in 150 cc. water was added 0.1 mole auric chloride, in the form of gold liquor containing approximately 35 percent gold, with stirring at 10 to 20° C. during 10 to 20 minutes. After stirring for an additional 10 to 20 minutes to allow complete reaction to the ethyl sulfide-aurous chloride complex, 0.11 to 0.12 mole of a secondary mercaptan was added with stirring at 10 to 20° C. In most instances, the gold secondary mercaptide was obtained as an oil or a well-dispersed solid. In some cases, the gold secondary mercaptide tended to form a lump, making stirring difficult. In these cases, enough chloroform or petroleum ether was added to dissolve or disperse the lump and allow good agitation. The reaction mixture was stirred for from one to seven hours at room temperature in most instances, or at from 50 to 60° C. if difficulty was experienced in dissolving or dispersing any lumpy material. The supernatant aqueous layer was removed by decantation or siphoning, and the residue was washed in the reaction vessel by stirring with two or three 150 cc. portions of water, removing the water after each wash by decantation or siphoning. The residue was stirred well with 250 cc. methanol. In most cases the mixture was then filtered, and the gold secondary mercaptide was washed on the filter with from 100 to 200 cc. methanol and air dried at room temperature. In some cases, when the precipitate appeared to be a little oily, methanol was removed by siphoning or decantation and the residue was stirred with an additional 250 cc. of methanol before filtering. In still other cases, the product was subjected to further purification, and these are noted with the descriptions of the individual products that follow. The amount of water in the reaction mixture and of water and methanol used in washing the product are not critical, and in a few cases greater or lesser amounts of these materials were used than those indicated above.

Some of the secondary mercaptans used in the following examples were prepared from the corresponding alcohol, or in some cases from the ketone reduced with sodium borohydride to the alcohol, which was converted to the corresponding bromide by reaction with phosphorous tribromide. The bromide was converted to the mercaptan by treatment with thiourea and hydrolysis of the resulting isothiuronium salt. The mercaptans were obtained as colorless liquids. The boiling points of mercaptans not previously described are noted in the examples that follow.

(A) *Gold isopropyl mercaptide.*—From 2-propanethiol there was obtained 20.04 g. white solid that did not melt to 250° C. and contained 72.41 percent gold.

(B) *Gold secondary butyl mercaptide.*—From 2-butanethiol there was obtained 28.47 g. white solid that decomposed ca. 235° C. and contained 68.88 percent gold.

(C) *Gold 1-methylheptyl mercaptide.*—From 2-octanethiol there was obtained a somewhat oily solid. This was purified by two crystallizations from ethyl acetate, yielding 32.42 g. white solid that softened ca. 120° C., melted 136–8° C. and contained 57.56 percent gold.

(D) *Gold 1-methyldodecyl mercaptide.*—From 2-tridecanethiol, B.P. 139° C./4 mm. Hg pressure, there was obtained an oily, rubbery mass that could not be obtained crystalline. It was purified by dissolving in chloroform and precipitating by adding methanol and by dissolving in ethyl acetate and precipitating by adding acetone. Residual solvent was removed by heating for several hours on a steam bath. The product was 39.20 g. white, somewhat rubbery resin that had no definite melting point, was a very viscous, clear, pale yellow oil at 100° C. and contained 50.0 percent gold.

(E) *Gold 1-methyloctadecyl mercaptide.*—From 2-nonadecanethiol, B.P. 172° C./1.5 mm. Hg pressure there was obtained a slightly oily solid that was purified by dissolving in warm chloroform and pouring with vigorous stirring into a large excess of methanol. The product was 47.80 g. very pale yellow solid that melted at 67–8° C. and contained 40.84 percent gold.

(F) *Gold diisobutylmethyl mercaptide.*—From 2,6-dimethyl-4-heptanethiol there was obtained 34.83 g. very pale yellow solid that softened ca. 83° C., melted 92–6° C. and contained 55.10 percent gold.

(G) *Gold alpha-butylbenzyl mercaptide.*—From 1-phenylpentanethiol there was obtained 37.32 g. white solid that softened ca. 190° C., melted at 194–8° C. with decomposition and contained 52.29 percent gold.

(H) *Gold alpha-undecylbenzyl mercaptide.*—From 1-phenyldodecanethiol, B.P. 131° C./0.1 mm. Hg pressure there was obtained an oily mass that was purified by stirring with ethyl acetate. The product was 18.84 g. white solid that had no definite melting point, coalesced to a rubbery plastic mass on standing and contained 42.42 percent gold. 27.91 grams of slightly less pure product was obtained from the ethyl acetate filtrate by removing solvent on a steam bath, repeatedly leaching with hot isopropanol, and again removing solvent on a steam bath.

(I) *Gold 1-(alpha-naphthyl)ethyl mercaptide.*—From 1-(alpha-naphthyl)ethanethiol there was obtained 36.33 g. pale yellow solid that softened ca. 170° C., melted at 179–83° C. with decomposition and contained 51.86 percent gold.

(J) *Gold 1-benzylethyl mercaptide.*—From 1-phenyl-2-propanethiol there was obtained 34.53 g. very pale tan solid that melted at 175–7° C. and contained 56.72 percent gold.

(K) *Gold 1-(diphenylmethyl)ethyl mercaptide.*—From 1,1-diphenyl-2-propanethiol, B.P. 93° C./0.2 mm. Hg pressure there was obtained 41.20 g. white solid that darkened ca. 205° C., melted 212–5° C. with decomposition and contained 47.56 percent gold.

(L) *Gold diphenylmethyl mercaptide.*—From diphenylmethanethiol there was obtained 41.87 g. yellow solid that melted ca. 92° C. to a very viscous oil that did not become fluid until about 160° C., and contained 46.99 percent gold.

(M) *Gold alpha-benzylbenzyl mercaptide.*—From 1,2-diphenylethanethiol there was obtained 40.97 g. white solid that melted at 205–10° C. with decomposition and contained 47.95 percent gold.

(N) *Gold dibenzylmethyl mercaptide.*—From 1,3-diphenyl-2-propanethiol, B.P. 118° C./0.2 mm. Hg pressure there was obtained a slightly oily solid that was purified by dissolving in chloroform and precipitating by pouring the chloroform solution into a large excess of methanol. The product was 34.56 g. pale yellow solid that softened ca. 70° C., melted indefinitely between 75 and 85° C. and contained 45.45 percent gold.

(O) *Gold dicyclohexylmethyl mercaptide.*—From dicyclohexylmethanethiol, B.P. 105° C./0.4 mm. Hg pressure, there was obtained an oil that could not be obtained crystalline. Removal of residual solvent on a steam bath left 39.58 g. very viscous yellow oil that set to a rubbery solid on cooling to room temperature, had no definite melting point and contained 49.79 percent gold.

EXAMPLE 3

Decorating Compositions Containing Gold Alpha-Methylbenzyl Mercaptide (A) *Bright gold decorating composition for brushing.*—A bright gold decorating composition suitable for brushing was prepared by mixing the following ingredients—

| Ingredient: | Parts by weight |
|---|---|
| Gold alpha-methylbenzyl mercaptide dissolved in nitrobenzene (30 percent Au) | 200 |
| Rhodium resinate dissolved in a mixture of essential oils and hydrocarbons (1 percent Rh) | 30 |
| Bismuth resinate dissolved in a mixture of essential oils (4.5 percent Bi) | 20 |
| Chromium resinate dissolved in a mixture of cyclohexanone and oil of turpentine (2.05 percent Cr) | 5 |
| Sulfurized balsam | 187 |
| Oil of rosemary | 100 |
| Cyclohexanone | 53 |
| Oil soluble red dye | 5 |
| Total | 600 |

The clear, red solution thus obtained contained 10 percent gold and was applied by brushing to a variety of articles, which were fired under conditions suitable for the individual article. In every case, adherent, conductive, metallic golden films were obtained on the articles, the appearance varying with the nature of the article as noted below.

| Article | Firing Conditions | Appearance of film |
|---|---|---|
| A fiber glass laminated plastic panel | Infra-red, 10 minutes. | Bright. |
| Mica sheet | do | Do. |
| Titanium panel | Infra-red, 15 minutes. | Matte. |
| Stainless steel panel, type 430, unpolished surface. | Flash [1] | Semi-bright. |
| Aluminum panel, Alcoa Alzak specular finish. | 530° C. kiln | Semi-bright (adherence fair). |
| Soda lime clear glass tumbler | 600° C. lehr | Bright. |
| White porcelain enamel on steel panel | do | Do. |
| A glass-ceramic known as Pyroceram | do | Do. |
| Borosilicate opal glass dish | 630° C. kiln | Do. |
| Borosilicate clear glass panel | 650° C. kiln | Do. |
| Tempered soda lime opal glass dish | do | Do. |
| Clear fused quartz panel | do | Do. |
| Glazed earthenware tile | 740° C. kiln | Do. |
| Hard porcelain (china) dish | 800° C. kiln | Do. |

[1] The stainless steel panel was flash fired by inserting in a kiln at 600° C. and removing after 2 minutes.

(B) *Bright gold decorating composition for screening or machine banding.*—A bright gold decorating composition suitable for screening or machine banding was prepared by mixing the following ingredients—

| Ingredient: | Parts by weight |
|---|---|
| Gold alpha-methylbenzyl mercaptide dissolved in nitrobenzene (30 percent Au) | 40 |
| Rhodium resinate dissolved in a mixture of essential oils and hydrocarbons (1 percent Rh) | 6 |
| Bismuth resinate dissolved in a mixture of essential oils (4.5 percent Bi) | 4 |
| Chromium resinate dissolved in a mixture of cyclohexanone and oil of turpentine (2.05 percent Cr) | 1 |
| Sulfurized balsam | 43 |
| Oil of rosemary | 30 |
| Cyclohexanone | 15 |
| Chloroform | 10 |
| Oil soluble red dye | 1 |
| Total | 150 |

The resulting solution was heated in an open dish on a steam bath until 64 parts by weight had evaporated, leaving 86 parts by weight of clear, viscous, dark red oil containing 14 percent gold. This was applied by screening through a 196 mesh Nitex screen to a soda lime clear glass panel and to a glazed earthenware tile and by machine banding to a soda lime clear glass tumbler. The soda lime clear glass panel and tumbler were lehr fired to 600° C. and the glazed earthenware tile was kiln fired to 740° C. In each case, bright, specular golden films were obtained.

(C) *Bright gold decorating composition for stamping.*—A bright gold decorating composition suitable for stamping was prepared by further heating 50 parts by weight of the composition of Example 3–B above in an open dish on a steam bath until an additional 7 parts by weight had evaporated, leaving 43 parts by weight of clear, very viscous, dark red oil containing 16.2 percent gold. This was applied by stamping to a soda lime clear glass panel, which was lehr fired to 600° C., and to a glazed earthenware tile, which was kiln fired to 740° C. In each case, bright, specular golden films were obtained.

(D) *Bright platinum decorating compositions.*—A flux concentrate was prepared by mixing the following ingredients—

| Ingredient: | Parts by weight |
|---|---|
| Bismuth resinate dissolved in a mixture of essential oils (4.5 percent Bi) | 20 |
| Chromium resinate dissolved in a mixture of cyclohexanone and oil of turpentine (2.05 percent Cr) | 5 |
| Sulfurized balsam | 187 |
| Oil of rosemary | 50 |
| Cyclohexanone | 53 |
| Oil soluble red dye | 5 |
| Total | 320 |

A bright platinum decorating composition was prepared by mixing the following ingredients—

| Ingredient: | Parts by weight |
|---|---|
| Gold alpha-methylbenzyl mercaptide dissolved in nitrobenzene (30 percent Au) | 12 |
| Platinum resinate dissolved in a mixture of essential oils (12 percent Pt) | 60 |
| Rhodium resinate dissolved in a mixture of essential oils and hydrocarbons (1 percent Rh) | 18 |
| Flux concentrate | 30 |
| Total | 120 |

The clear, red solution thus obtained contained 3 percent gold and 6 percent platinum and was applied by brushing to a soda lime clear glass tumbler, which was lehr fired to 600° C., and to a glazed ceramic tile, which was kiln fired to 740° C. In each case bright, specular silvery films were obtained that were excellent conductors of electricity and were readily solderable.

Another bright platinum decorating composition was prepared by mixing the following ingredients—

| Ingredient: | Parts by weight |
|---|---|
| Gold alpha-methylbenzyl mercaptide dissolved in nitrobenzene (30 percent Au) | 12 |
| Chloroplatinous n-octylmercaptide-ethyl sulfide complex (41.5 percent Pt) (Example XVIII of U.S. patent application Serial No. 4,212, filed Jan. 25, 1960, now U.S. Patent No. 3,022,177) | 17 |
| Rhodium resinate dissolved in a mixture of essential oils and hydrocarbons (1 percent Rh) | 18 |
| Flux concentrate | 64 |
| Oil of rosemary | 9 |
| Total | 120 |

The clear, red solution thus obtained contained 3 percent gold and 6 percent platinum and was applied by brushing to a soda lime clear glass tumbler and to a glazed earthenware tile. The tumbler and tile were fired as described above, giving films substantially identical to those obtained from the above composition containing platinum resinate.

(E) *Bright palladium decorating compositions.*—A bright palladium decorating composition was prepared by mixing the following ingredients—

| Ingredient: | Parts by weight |
|---|---|
| Gold alpha-methylbenzyl mercaptide dissolved in nitrobenzene (30 percent Au) | 36 |
| Palladium resinate dissolved in a mixture of essential oils and hydrocarbons (9 percent Pd) | 20 |
| Rhodium resinate dissolved in a mixture of essential oils and hydrocarbons (1 percent Rh) | 6 |
| The flux concentrate of Example 3-D above | 58 |
| Total | 120 |

The clear, dark red solution thus obtained contained 9 percent gold and 1.5 percent palladium. It was applied by brushing to a soda lime clear glass tumbler, which was lehr fired to 600° C., and to a glazed earthenware tile, which was kiln fired to 740° C. In each case bright, specular silvery films were obtained that were excellent conductors of electricity and were readily solderable.

Another liquid bright palladium decorating solution was prepared by mixing the following ingredients—

| Ingredient: | Parts by weight |
|---|---|
| Gold alpha-methylbenzyl mercaptide dissolved in nitrobenzene (30 percent Au) | 36 |
| Dichlorobisdi-n-butylsulfidepalladium (II) dissolved in toluene (20 percent Pd) (Example I of U.S. patent application Serial No. 60,575, filed Oct. 5, 1960) | 9 |
| Rhodium resinate dissolved in a mixture of essential oils and hydrocarbons (1 percent Rh) | 6 |
| The flux concentrate of Example 3-D above | 64 |
| Oil of rosemary | 5 |
| Total | 120 |

The clear, red solution thus obtained contained 9 percent gold and 1.5 percent palladium and was applied by brushing to a soda lime clear glass tumbler and to a glazed earthenware tile. The tumbler and tile were fired as described above, giving films substantially identical to those obtained from the above composition containing palladium resinate.

(F) *Green gold decorating composition.*—A green gold decorating composition was prepared by mixing the following ingredients—

| Ingredient: | Parts by weight |
|---|---|
| Gold alpha-methylbenzyl mercaptide dissolved in nitrobenzene (30 percent Au) | 200 |
| Silver resinate dissolved in a mixture of essential oils (24 percent Ag) | 75 |
| Rhodium resinate dissolved in a mixture of essential oils and hydrocarbons (1 percent Rh) | 30 |
| Bismuth resinate dissolved in a mixture of essential oils (4.5 percent Bi) | 20 |
| Chromium resinate dissolved in a mixture of cyclohexanone and oil of turpentine (2.05 percent Cr) | 5 |
| Sulfurized balsam | 190 |
| Oil of rosemary | 75 |
| Oil soluble red dye | 5 |
| Total | 600 |

The clear red solution thus obtained contained 10 percent gold and 3 percent silver and was applied by brushing to a soda lime clear glass tumbler, which was lehr fired to 600° C., and to a glazed earthenware tile, which was kiln fired to 740° C. In each case, bright, specular golden films with a greenish cast were obtained.

(G) *Gold luster decorating composition.*—A gold luster decorating composition was prepared by mixing the following ingredients—

| Ingredient: | Parts by weight |
|---|---|
| Gold alpha-methylbenzyl mercaptide dissolved in nitrobenzene (30 percent Au) | 67 |
| Bismuth resinate dissolved in a mixture of essential oils (4.5 percent Bi) | 400 |
| Rosin dissolved in oil of turpentine (50 percent rosin) | 1210 |
| Chloroform | 320 |
| Oil soluble red dye | 3 |
| Total | 2000 |

The clear red solution thus obtained contained 1 percent gold and was applied by brushing to a soda lime clear glass tumbler and to a glazed ceramic tile. When the tumbler was lehr fired to 600° C. a bright, pale blue, non-conductive film with a golden iridescence was obtained. When the tile was kiln fired to 740° C., a brilliant, deep purple, non-conductive film with a golden iridescence was obtained.

(H) *Burnish gold decorating composition.*—A paste composition was obtained by milling the following ingredients in a roll mill—

| Ingredient: | Parts by weight |
|---|---|
| Gold alpha-methylbenzyl mercaptide (58.5 percent Au) | 924 |
| Lead borate | 75 |
| Bismuth subnitrate | 25 |
| Mercuric oxide | 600 |
| Rosin dissolved in oil of turpentine (50 percent rosin) | 400 |
| Oil of turpentine | 216 |
| Total | 2240 |

40 parts of this paste was mixed with 20 parts of gold alpha-methylbenzyl mercaptide dissolved in nitrobenzene (30 percent Au) and 15 parts chloroform to give 75 parts, all parts being by weight, of suspension containing 20.9 percent gold. The suspension was applied by brushing to a soda lime clear glass tumbler, which was lehr fired to 600° C., and to a glazed ceramic tile, which was kiln fired to 740° C. In each case a matte, golden film was obtained that gave a rich, lustrous golden film on being burnished.

(I) *Matte gold decorating composition.*—A matte gold decorating composition was obtained by mixing the following ingredients—

| Ingredient: | Parts by weight |
|---|---|
| Gold alpha-methylbenzyl mercaptide dissolved in nitrobenzene (30 percent Au) | 120 |
| Rhodium resinate dissolved in a mixture of essential oils and hydrocarbons (1 percent Rh) | 12 |
| Lead borate | 3 |
| Bismuth subnitrate | 1 |
| Sulfurized balsam | 80 |
| Oil of rosemary | 24 |
| Total | 240 |

The resulting suspension contained 15 percent gold and was applied by brushing to a soda lime clear glass tumber, which was lehr fired to 600° C., and to a glazed ceramic tile which was kiln fired to 740° C. In each case a matte golden film was obtained.

(J) *Thermoplastic gold decorating composition.*—A thermoplastic gold decorating composition suitable for hot screening was prepared by mixing the following ingredients—

| Ingredient: | Parts by weight |
|---|---|
| Gold alpha-methylbenzyl mercaptide (58.5 percent Au) | 30 |
| Rhodium resinate dissolved in a mixture of essential oils and hydrocarbons (1 percent Rh) | 7 |
| Bismuth resinate dissolved in a mixture of essential oils (4.5 percent Bi) | 6 |
| Chromium resinate dissolved in a mixture of cyclohexanone and oil of turpentine (2.05 percent Cr) | 2 |
| Sulfurized rosin | 30 |
| Sulfurized balsam | 21 |
| Hydrogenated rosin ("Staybelite Resin") | 20 |
| Stearic acid | 60 |
| Finely divided melamine powder | 11 |
| Nitrobenzene | 50 |
| Total | 237 |

The mixture was held in an open dish with occasional stirring on a steam bath under an infra-red lamp until 66 parts by weight had evaporated. The residue was 171 parts by weight of a viscous oil containing 10.3 percent gold that set to a hard solid on cooling to room temperature. This was applied to a soda lime clear glass tumbler by screening through a 325 mesh stainless steel screen maintained at about 93° C. The applied film immediately set to a hard tack-free state and gave a bright gold film on kiln firing to 600° C.

EXAMPLE 4

*Decorating Compositions Containing Gold Isopropyl Mercaptide*

(A) *Burnish gold decorating composition.*—A mixture of the following ingredients was milled in a roll mill to a moderately viscous paste containing 22.5 percent gold—

| Ingredient: | Parts by weight |
|---|---|
| Gold isopropyl mercaptide (72.4 percent Au) | 1488 |
| Mercuric oxide | 800 |
| Lead borate | 150 |
| Bismuth subnitrate | 50 |
| Rosin dissolved in oil of turpentine (50 percent rosin) | 1600 |
| Oil of rosemary | 712 |
| Total | 4800 |

The paste was thinned to brushing consistency with oil of turpentine and was applied by brushing to a soda lime clear glass tumbler, which was lehr fired to 600° C., and to a glazed ceramic tile, which was kiln fired to 740° C. In each case a matte gold film was obtained that had a soft golden luster after burnishing.

(B) *Semi-bright gold decorating compositions.*—A flux concentrate was prepared by mixing the following ingredients—

| Ingredient: | Parts by weight |
|---|---|
| Rhodium resinate dissolved in a mixture of essential oils and hydrocarbons (1 percent Rh) | 18 |
| Bismuth resinate dissolved in a mixture of essential oils (4.5 percent Bi) | 12 |
| Chromium resinate dissolved in a mixture of cyclohexanone and oil of turpentine (2.05 percent Cr) | 3 |
| Sulfurized balsam | 114 |
| Cyclohexanone | 30 |
| Oil soluble red dye | 3 |
| Total | 180 |

A gold decorating composition was prepared by mixing the following ingredients—

| Ingredient: | Parts by weight |
|---|---|
| Gold isopropyl mercaptide (72.4 percent Au) | 62 |
| Gold resinate dissolved in a mixture of essential oils (24 percent Au) | 63 |
| Flux concentrate | 305 |
| Oil of rosemary | 170 |
| Total | 600 |

The resulting suspension containing 10 percent gold was applied by brushing to a soda lime clear glass tumbler and to a glazed ceramic tile. The tumbler was lehr fired to 600° C., giving a semi-bright, somewhat dark gold film. The tile was kiln fired to 740° C., giving a semi-bright coppery gold film.

A gold decorating composition was prepared by mixing the following ingredients—

| Ingredient: | Parts by weight |
|---|---|
| Gold isopropyl mercaptide (72.4 percent Au) | 62 |
| Gold tert-dodecyl mercaptide dissolved in heptane (30 percent Au) | 50 |
| Flux concentrate | 305 |
| Oil of rosemary | 183 |
| Total | 600 |

The resulting suspension containing 10 percent gold was applied by brushing to a soda lime clear glass tumbler, which was lehr fired to 600° C., and to a glazed ceramic tile, which was kiln fired to 740° C. In each case a semi-bright coppery gold film was obtained.

A gold decorating composition was prepared by mixing the following ingredients—

| Ingredient: | Parts by weight |
|---|---|
| Gold isopropyl mercaptide (72.4 percent Au) | 41 |
| Gold pinene mercaptide (53.8 percent Au) | 56 |
| Flux concentrate | 300 |
| Oil of rosemary | 203 |
| Total | 600 |

The resulting suspension containing 10 percent gold was applied by brushing to a soda lime clear glass tumbler, which was lehr fired to 600° C., and to a glazed ceramic tile, which was kiln fired to 740° C. In each case a semi-bright, slightly coppery gold film was obtained.

EXAMPLE 5

*Decorating Composition Containing Gold Secondary Butyl Mercaptide*

A flux concentrate was prepared by mixing the following ingredients—

| Ingredient: | Parts by weight |
|---|---|
| Rhodium resinate dissolved in a mixture of essential oils and hydrocarbons (1 percent Rh) | 60 |
| Bismuth resinate dissolved in a mixture of essential oils (4.5 percent Bi) | 40 |
| Chromium resinate dissolved in a mixture of cyclohexanone and oil of turpentine (2.05 percent Cr) | 10 |
| Sulfurized balsam | 374 |
| Cyclohexanone | 106 |
| Total | 590 |

A gold decorating composition was prepared by mixing the following ingredients—

| Ingredient: | Parts by weight |
|---|---|
| Gold secondary butyl mercaptide (68.8 percent Au) | 131 |
| Flux concentrate | 295 |
| Asphalt dissolved in oil of turpentine (30 percent asphalt) | 300 |
| Oil of rosemary | 74 |
| Toluene | 100 |
| Total | 900 |

The resulting suspension containing 10 percent gold was applied by brushing to a soda lime clear glass tumbler, which was lehr fired to 600° C., and to a glazed ceramic tile, which was kiln fired to 740° C. In each case a matte brown film was obtained that gave a lustrous, slightly dark gold film on burnishing.

EXAMPLE 6

*Decorating Composition Containing Gold 1-Methylheptyl Mercaptide*

A gold decorating composition was prepared by mixing the following ingredients—

| Ingredient: | Parts by weight |
|---|---|
| Gold 1-methylheptyl mercaptide (57.6 percent Au) | 156 |
| The flux concentrate of Example 5 | 295 |
| Asphalt dissolved in oil of turpentine (30 percent asphalt) | 300 |
| Oil of rosemary | 49 |
| Toluene | 100 |
| Total | 900 |

The resulting clear solution containing 10 percent gold was applied by brushing to a soda lime clear glass tumbler, which was lehr fired to 600° C., and to a glazed ceramic tile, which was kiln fired to 740° C. In each case a matte gold film was obtained that gave a lustrous gold film on burnishing.

EXAMPLE 7

*Decorating Composition Containing Gold 1-Methyldodecyl Mercaptide*

A gold decorating composition was prepared by mixing the following ingredients—

| Ingredient: | Parts by weight |
|---|---|
| Gold 1-methyldodecyl mercaptide dissolved in toluene (28.1 percent Au) | 328 |
| The flux concentrate of Example 5 | 272 |
| Asphalt dissolved in oil of turpentine (30 percent asphalt) | 257 |
| Oil of rosemary | 43 |
| Total | 900 |

The resulting clear solution containing 10.2 percent gold was applied by brushing to a soda lime clear glass tumbler, which was lehr fired to 600° C., and to a glazed ceramic tile, which was kiln fired to 740° C. In each case a matte brownish film was obtained that gave a lustrous golden film on burnishing.

EXAMPLE 8

*Decorating Composition Containing Gold 1-Methyloctadecyl Mercaptide*

A gold decorating composition was prepared by mixing the following ingredients—

| Ingredient: | Parts by weight |
|---|---|
| Gold 1-methyloctadecyl mercaptide (40.8 percent Au) | 22 |
| The flux concentrate of Example 5 | 25 |
| Asphalt dissolved in oil of turpentine (30 percent asphalt) | 13 |
| Oil of rosemary | 10 |
| Total | 70 |

A clear solution was obtained on warming that contained 12.8 percent gold and set to a gel on cooling. The solution was applied by brushing while warm to a soda lime clear glass tumbler, which was lehr fired to 600° C., and to a glazed ceramic tile, which was kiln fired to 740° C. In each case a matte brownish film was obtained that gave a lustrous golden film on burnishing.

EXAMPLE 9

*Gold Decorating Composition Containing Gold Diisobutylmethyl Mercaptide*

A gold decorating composition was prepared by mixing the following ingredients—

| Ingredient: | Parts by weight |
|---|---|
| Gold diisobutylmethyl mercaptide (55.1 percent Au) | 163 |
| The flux concentrate of Example 5 | 295 |
| Asphalt dissolved in oil of turpentine (30 percent asphalt) | 300 |
| Oil of rosemary | 42 |
| Toluene | 100 |
| Total | 900 |

The resulting clear solution containing 10 percent gold was applied by brushing to a soda lime clear glass tumbler and to a glazed ceramic tile. When lehr fired to 600° C., the tumbler gave a semi-bright gold film. When kiln fired to 740° C., the tile gave a matte brownish film that became golden and lustrous on burnishing.

EXAMPLE 10

*Gold Decorating Compoistion Containing Gold Alpha-Butylbenzyl Mercaptide*

A gold decorating composition was prepared by mixing the following ingredients—

| Ingredient: | Parts by weight |
|---|---|
| Gold alpha-butylbenzyl mercaptide (52.3 percent Au) | 172 |
| The flux concentrate of Example 5 | 295 |
| Oil of rosemary | 321 |
| Toluene | 100 |
| Total | 888 |

The resulting suspension containing 10.1 percent gold was applied by brushing to a soda lime clear glass tumbler, which was lehr fired to 600° C., and to a glazed ceramic tile, which was kiln fired to 740° C. In each case a bright, specular gold film was obtained.

EXAMPLE 11

*Gold Decorating Composition Containing Gold Alpha-Undecylbenzyl Mercaptide*

A gold decorating composition was prepared by mixing the following ingredients—

| Ingredient: | Parts by weight |
|---|---|
| Gold alpha-undecylbenzyl mercaptide (43.3 percent Au) | 208 |
| The flux concentrate of Example 5 | 290 |
| Asphalt dissolved in oil of turpentine (30 percent asphalt) | 289 |
| Oil of rosemary | 2 |
| Toluene | 100 |
| Total | 889 |

The resulting clear solution containing 10.1 percent gold was applied by brushing to a soda lime clear glass tumbler which was lehr fired to 600° C., and to a glazed ceramic tile, which was kiln fired to 740° C. In each case a matte gold film was obtained that became lustrous on burnishing.

EXAMPLE 12

*Gold Decorating Composition Containing Gold 1-(Alpha-Naphthyl) Ethyl Mercaptide*

A gold decorating composition was prepared by mixing the following ingredients—

| Ingredient: | Parts by weight |
|---|---|
| Gold 1-(alpha-naphthyl) ethyl mercaptide (51.9 percent Au) | 174 |
| The flux concentrate of Example 5 | 250 |
| Oil of rosemary | 76 |
| Toluene | 100 |
| Total | 600 |

The resulting suspension containing 15 percent gold was applied by brushing to a soda lime clear glass tumbler, which was lehr fired to 600° C., and to a glazed ceramic tile, which was kiln fired to 740° C. In each case bright, specular golden films were obtained.

EXAMPLE 13

*Gold Decorating Composition Containing Gold 1-Benzylethyl Mercaptide*

A gold decorating composition was prepared by mixing the following ingredients—

| Ingredient: | Parts by weight |
|---|---|
| Gold 1-benzylethyl mercaptide (56.7 percent Au) | 158 |
| The flux concentrate of Example 5 | 295 |
| Rosin dissolved in oil of turpentine (50 percent rosin) | 47 |
| Toluene | 100 |
| Total | 600 |

The resulting suspension containing 14.9 percent gold was applied by brushing to a soda lime clear glass tumbler, which was lehr fired to 600° C., and to a glazed ceramic tile, which was kiln fired to 740° C. In each case a matte brownish film was obtained that became golden and lustrous on burnishing.

EXAMPLE 14

*Gold Decorating Composition Containing Gold 1-(Diphenylmethyl) Ethyl Mercaptide*

A gold decorating composition was prepared by mixing the following ingredients—

| Ingredient: | Parts by weight |
|---|---|
| Gold 1-(diphenylmethyl)ethyl mercaptide (47.6 percent Au) | 189 |
| The flux concentrate of Example 5 | 250 |
| Oil of rosemary | 61 |
| Toluene | 100 |
| Total | 600 |

The resulting suspension containing 15 percent gold was applied by brushing to a soda lime clear glass tumbler, which was lehr fired to 600° C., and to a glazed ceramic tile, which was kiln fired to 740° C. In each case, specular, brilliant golden films were obtained.

EXAMPLE 15

*Gold Decorating Composition Containing Gold Diphenylmethyl Mercaptide*

A gold decorating composition was prepared by mixing the following ingredients—

| Ingredient: | Parts by weight |
|---|---|
| Gold diphenylmethyl mercaptide (47.0 percent Au) | 190 |
| The flux concentrate of Example 5 | 295 |
| Oil of rosemary | 15 |
| Toluene | 100 |
| Total | 600 |

The resulting clear solution containing 14.9 percent gold was applied by brushing to a soda lime clear glass tumbler, which was lehr fired to 600° C., and to a glazed ceramic tile, which was kiln fired to 740° C. In each case, specular, brilliant golden films were obtained.

EXAMPLE 16

*Gold Decorating Composition Containing Gold Alpha-Benzylbenzyl Mercaptide*

A gold decorating composition was prepared by mixing the following ingredients—

| Ingredient: | Parts by weight |
|---|---|
| Gold alpha-benzylbenzyl mercaptide (48.0 percent Au) | 19 |
| The flux concentrate of Example 5 | 25 |
| Oil of rosemary | 6 |
| Toluene | 10 |
| Total | 60 |

The resulting suspension containing 15.2 percent gold was applied by brushing to a soda lime clear glass tumbler, which was lehr fired to 600° C., and to a glazed ceramic tile, which was kiln fired to 740° C. In each case, bright, golden films were obtained.

EXAMPLE 17

*Gold Decorating Composition Containing Gold Dibenzylmethyl Mercaptide*

A gold decorating composition was prepared by mixing the following ingredients—

| Ingredient: | Parts by weight |
|---|---|
| Gold dibenzylmethyl mercaptide (45.5 percent Au) | 198 |
| The flux concentrate of Example 5 | 295 |
| Oil of rosemary | 7 |
| Toluene | 100 |
| Total | 600 |

The resulting clear solution containing 15 percent gold was applied by brushing to a soda lime clear glass tumbler, which was lehr fired to 600° C., and to a glazed ceramic tile, which was kiln fired to 740° C. In each case, bright, specular golden films were obtained.

EXAMPLE 18

*Gold Decorating Composition Containing Gold Dicyclohexylmethyl Mercaptide*

A gold decorating composition was prepared by mixing the following ingredients—

| Ingredient: | Parts by weight |
|---|---|
| Gold dicylohexylmethyl mercaptide (49.8 percent Au) | 180 |
| The flux concentrate of Example 5 | 295 |
| Asphalt dissolved in oil of turpentine (30 percent asphalt) | 153 |
| Oil of rosemary | 75 |
| Toluene | 50 |
| Total | 753 |

The resulting clear solution containing 11.9 percent gold was applied by brushing to a soda lime clear glass tumbler, which was lehr fired to 600° C., and to a glazed ceramic tile, which was kiln fired to 740° C. In each case, a matte brown film was obtained that gave a lustrous golden film on burnishing.

It will be obvious to those skilled in the art that many modifications may be made within the scope of the present invention without departing from the spirit thereof, and the invention includes all such modifications.

What is claimed is:
1. A non-terpenoid gold secondary mercaptide having the formula

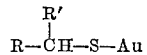

wherein R and R' are selected from the group consisting of alkyl, cycloalkyl, aryl, and aralkyl.
2. Gold isopropyl mercaptide.
3. Gold secondary butyl mercaptide.
4. Gold 1-methylheptyl mercaptide.
5. Gold 1-methyldodecyl mercaptide.
6. Gold 1-methyloctadecyl mercaptide.
7. Gold diisobutylmethyl mercaptide.
8. Gold alpha-methylbenzyl mercaptide.
9. Gold alpha-butylbenzyl mercaptide.
10. Gold alpha-undecylbenzyl mercaptide.
11. Gold 1-(alpha-naphthyl) ethyl mercaptide.
12. Gold 1-benzylethyl mercaptide.
13. Gold 1-(diphenylmethyl)ethyl mercaptide.
14. Gold diphenylmethyl mercaptide.
15. Gold alpha-benzylbenzyl mercaptide.
16. Gold dibenzylmethyl mercaptide.
17. Gold dicyclohexylmethyl mercaptide.

References Cited in the file of this patent

UNITED STATES PATENTS

| 2,509,198 | Moore | May 30, 1950 |
| 2,880,222 | Friedheim | Mar. 31, 1959 |
| 2,914,547 | Gaetner | Nov. 24, 1959 |
| 2,984,575 | Fitch | May 16, 1961 |
| 2,994,614 | Fitch | Aug. 1, 1961 |
| 3,092,504 | Langley | June 4, 1963 |